US008745580B2

(12) United States Patent
Nathan et al.

(10) Patent No.: US 8,745,580 B2
(45) Date of Patent: Jun. 3, 2014

(54) TRANSPARENT TYPE MATCHING IN A PROGRAMMING ENVIRONMENT

(75) Inventors: Adam D. Nathan, Redmond, WA (US); Andrew R. Sterland, Seattle, WA (US); Timothy S. Rice, Bellevue, WA (US); Michael J. Leonard, Lake Stevens, WA (US); John I. Montgomery, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 12/121,984

(22) Filed: May 16, 2008

(65) Prior Publication Data

US 2009/0288065 A1 Nov. 19, 2009

(51) Int. Cl.
*G06F 9/44* (2006.01)

(52) U.S. Cl.
USPC ............ 717/108; 717/109; 717/140; 717/113

(58) Field of Classification Search
None
See application file for complete search history.

(56) References Cited

U.S. PATENT DOCUMENTS

| | | | |
|---|---|---|---|
| 5,261,043 A * | 11/1993 | Wolber et al. ................. | 715/809 |
| 6,044,216 A | 3/2000 | Bhargava et al. | |
| 6,757,731 B1 | 6/2004 | Barnes et al. | |
| 6,854,123 B1 | 2/2005 | Lewallen | |
| 6,957,439 B1 | 10/2005 | Lewallen | |
| 7,020,882 B1 | 3/2006 | Lewallen | |
| 7,299,419 B2 * | 11/2007 | Evans ........................... | 715/763 |
| 7,340,745 B2 | 3/2008 | Waldorf | |
| 7,681,184 B1 * | 3/2010 | Weedon et al. ................ | 717/137 |
| 7,886,264 B1 * | 2/2011 | Peyton et al. ................. | 717/100 |
| 2006/0085798 A1 | 4/2006 | Bendiksen et al. | |
| 2006/0150148 A1 * | 7/2006 | Beckett et al. ................ | 717/109 |
| 2007/0083874 A1 | 4/2007 | Vasudevan et al. | |
| 2008/0034381 A1 | 2/2008 | Jalon et al. | |

OTHER PUBLICATIONS

Irina Medvinskaya, Convert a byte array to a string with VB.NET, Jun. 28, 2007, TechPublic.*
"Convert Object to Byte Array and Viceversa (Serialization)", 2007, DZone, Inc., pp. 4.
"Lorentz 2.0 Released: A Generic Object Conversion Framework", Aug. 5, 2005, retrieved at << http://www.theserverside.com/news/thread.tss?thread_id=35700 >>, TheServerSide, pp. 6.

* cited by examiner

*Primary Examiner* — Lewis A Bullock, Jr.
*Assistant Examiner* — Hau H Hoang
(74) *Attorney, Agent, or Firm* — Kevin Sullivan; Kate Drakos; Micky Minhas

(57) ABSTRACT

Described is a technology in a programming (development and/or runtime) environment by which data type mismatches between the output and input of computer program software components (e.g., APIs) are detected, with the output transparently converted such that the converted input may be understood by the inputting component. When components are interconnected in a programming environment, metadata associated with those components is evaluated to determine a type mismatch, e.g., between objects and arrays. If mismatched, an output object is converted to a single-element array for input, or alternatively, an output array is converted to a series of objects, each object sent within a loop for input. The transparent conversion may be performed by the programming environment during runtime, or by inserting conversion code prior to compilation.

19 Claims, 3 Drawing Sheets

TRANSPARENT TYPE MATCHING IN A PROGRAMMING ENVIRONMENT

BACKGROUND

In some abstract programming and runtime environments, programmers interact with a graphical user interface to select and interconnect components to build a program. For example, in such a visual programming environment, programmers arrange graphical representations of components (such as representing functions/application programming interfaces or APIs), connect them together, and see a representation of each of them as well their interconnection relationships to one another.

However, the programmer to needs to ensure that components are compatible with one another, that is, so that inputs and outputs are mapped cleanly to one another. By way of example, consider two components "A" and "B" comprising APIs that are linked to each other such that the output of A is sent to the input of B. If A is configured to send an array, but B is expecting a single object (or vice-versa), there will be a type mismatch and the connection will fail. This burdens programmers by adding complexity to programming, which conflicts with a general aim to simplify programming through such environments.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which computer program software components (e.g., APIs) are processed for type mismatch detection, e.g., to recognize from associated metadata when a first software component is not able to process the output data as structured by a second software component to which it is connected. When detected, an operation is transparently performed by a programming environment so as to execute logic that converts the output data as structured by the second software component into input data that the first software component is able to process.

The conversion may be to promote an object output data type to a single-element array input data type. Conversely, the conversion may be performed to process an array output data type to a series of objects, which via a loop are individually provided as objects to the inputting software component. Conversion may be accomplished by transparently providing logic during the runtime to change the execution path, and/or by inserting code prior to compilation such that when compiled and later executed, the conversion transparently occurs between the output and input.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards having a programming environment transparently manage type matching between two components, or blocks (e.g., their interfaces) in a manner that is transparent to the programmer. For example, when components such as APIs that return or expect different structures (e.g., an array versus an object) are interconnected, the programming environment detects the type mismatch, and transparently inserts code that makes the components' input and output data compatible. As a more particular example, when a component expects an object but is coupled to a component that outputs an array, the programming environment adds code that processes the array elements into individual objects so that objects are received at the component that expects objects, one object after another via a loop or the like. Conversely, when a component expects an array as input, and the component to which it is coupled outputs an object, the programming environment transparently inserts code that promotes (converts) the object into a single-element array.

While some of the examples described herein are directed towards a graphical user interface by which the programmer interacts with representations of components (e.g., icons) such as by dragging a representative icon onto a design surface, it is understood that these are only examples. Indeed, any way of entering code, including typing text, may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
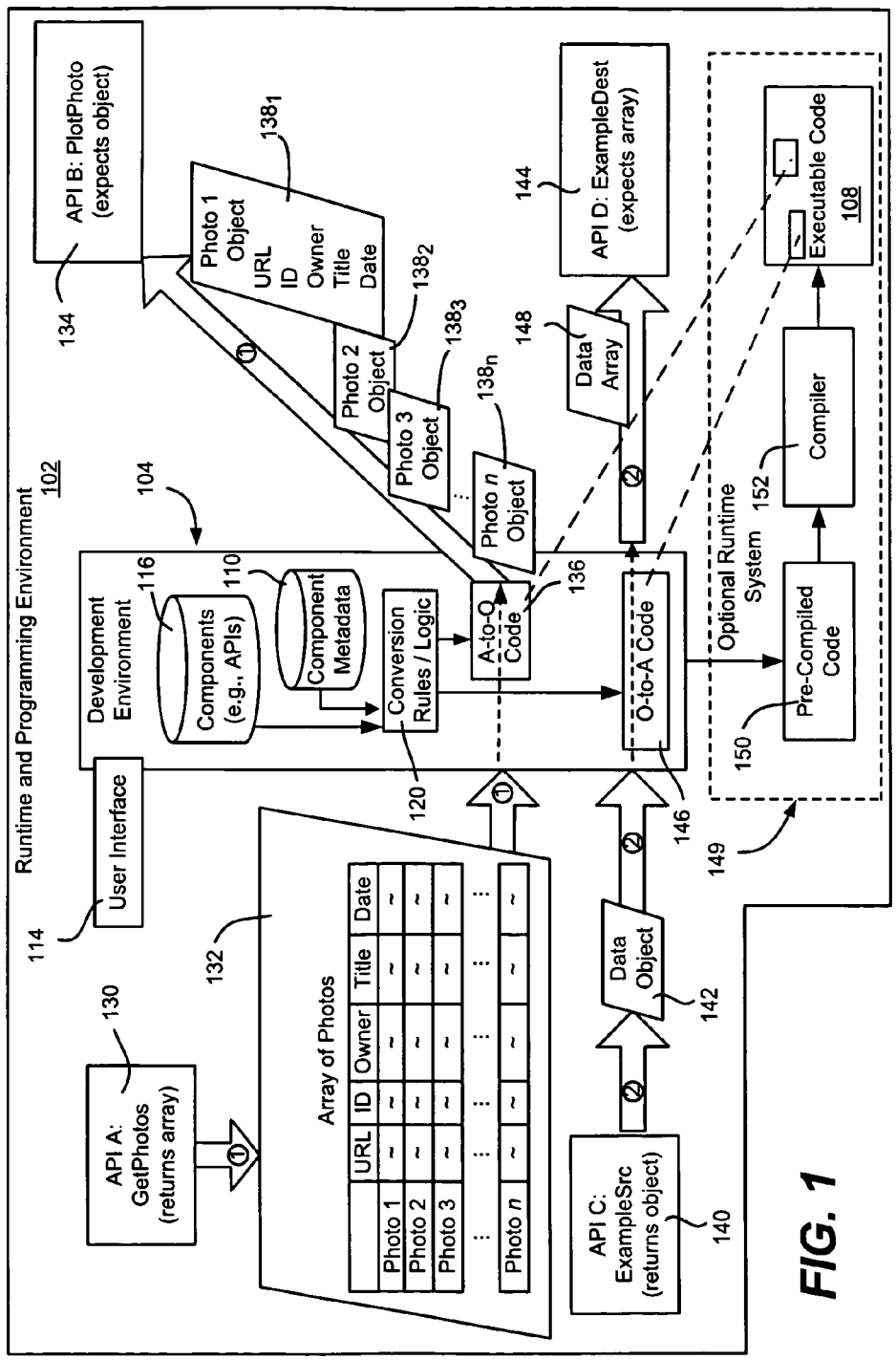
FIG. 1 is a block diagram representing example components in a programming environment for using metadata to transparently match data types of components that are coupled together.

Turning to FIG. 1, there is shown a general block diagram representing example components in a runtime/programming environment 102, such as one in which metadata (e.g., XML-based) is used to augment a programming language. An example of such metadata is described in a copending U.S. patent application Ser. No. 12/122,021, entitled "Augmenting Programming Languages with a Type System," assigned to the assignee of the present application, and hereby incorporated by reference. Note that while various kinds of metadata are described therein, e.g., type metadata and descriptive metadata, used for various purposes, as will be understood only some metadata that is sufficient to determine a component's input and output data types need be used herein.

Note that in the example implementation generally represented in FIG. 1, a development environment 104 is shown in the runtime/programming environment 102 as being tightly linked to one another, although this is not necessary, e.g., development may occur separately, such as well before the program is run, (such as via an optional runtime system 149, described below). In any event, for simplicity, the term "programming environment" is used herein to represent the development environment 104 or the runtime system 106 that executes a running application, or both, however coupled.

The development environment 104 or runtime environment 106, or both, may be hosted in a web browser, for example.

In the development environment 104, the exemplified metadata includes component metadata 110, which may include type data and descriptive data such as in a single data structure, (e.g., file). In a visual development environment, the programmer has a user interface 114 with which to interact, such as to select a software component (also referred to as a block) from a set of reusable components 116, e.g., interfaces such as APIs, functions and so forth. For example, the components may correspond to classes each containing a collection of interfaces, although a component may be an individual function or the like. The programmer may interconnect such components, e.g., to link interfaces together. Each component, or individual interfaces, may have an associated set of one or more metadata files.

In general, the component metadata 110 defines a specific set of types that can be used with each component, such as to enable enhanced type matching relative to the basic type matching provided by a scripting engine. More particularly, based on the type data, type rules/logic 120 or the like may perform tasks such as to perform parameter validation and matching. For example, as described herein, the rules/logic 120 ensures that that output data of one interface is compatible with the input data of another interface to which it is connected, such as by transparently inserting code that converts one output type to an appropriate type for input, typically without any programmer intervention. Other actions include enforcing constraints (e.g., ensuring a value is within a range, is present when required, is non-zero, is positive, and/or many others), set default values, and so forth.

Note that as used herein, "transparent" and the like does not mean wholly invisible or undetectable to the programmer, but rather that the programming environment removes the programming complexity by automatically matching a component's output data to another component's input data. Even though automatic, a prompt or warning may be first shown so that, for example, the programmer may make a different component choice. Other visible indications, such as a "conversion" block that is automatically inserted between components, a change in color of a component and/or an interconnecting indicator, and so forth, may be used. Such an indication may be useful in debugging, e.g., to recognize that such a conversion exists.

To accomplish transparent type matching, in general, the programming environment 102 includes the rules/logic 120 such as by adding a layer or the like that recognizes the types of input and output that components expect and return, respectively. If necessary, as described below the rules/logic 120 converts an output type into a different input type so that it can be properly input.

By way of an example shown in FIG. 1 via the wide arrows labeled one (1), there is represented general aspects related to processing an array into a serialized set of objects. In this example, an application program includes API calls, in which a first API returns an array of photographs and related data, which is then passed to a second API, which for example attempts to plot the photographs/data on a map. However, the second API cannot accept an array as input, and thus as described herein, the programming environment transparently processes the array into a series of objects.

As a more particular example, consider an API A 130 that returns an array 132 as its output data, which a programmer couples to an API B 134 that expects a single object as its input. For example, the API A 130 outputs the array of photographs and related data. The API B 134 inputs an object corresponding to a photograph and possibly some or all of that data. As described below, the conversion rules/logic 120 detects the mismatch via each API's associated type metadata, and automatically inserts (array to object, or A-to-O) code 136, which when run in executable code 154, calls the API B 134 in a loop so that the API B 134 receives the return values as distinct objects $138_1$-$138_n$. Note that the runtime/programming environment may process program metadata via an interpreter (not explicitly shown) to perform the operations.

As can be readily appreciated, there are various kinds of type mismatching, however in general, the programming environment is intelligent enough to determine the typing of such APIs and to process the arrays into loops where necessary. As a result, these loops are abstracted away from programmers who need not be burdened with recognizing the need for such loops, nor with coding them.

By way of an example of transparent type matching in the opposite conversion direction, shown in FIG. 1 via the wide arrows labeled two (2), consider an API C 140 that returns an object 142 as its output data, which a programmer couples to an API D 144 that expects an array as its input. As described below, the conversion rules/logic 120 detects the mismatch via each API's associated type metadata, and automatically inserts (object to array, or O-to-A) code 146, which when run in the executable code 108, promotes the object to a single element array 148, e.g., by placing its structured data into appropriate array fields.

Note that also represented in FIG. 1 is an alternative, optional runtime system 149. This alternative takes pre-compiled code 150 from the development environment 104, and compiles it via a compiler 152 into the executable code 108; the APIs represented in FIG. 1 as well as the inserted A-to-O code 136 and O-to-A code 146 are in the pre-compiled code (or linked thereto after compilation) and thus operate in the executable code 108. The code may be run as it is compiled, e.g., via a just-in-time (JIT) compiler, may be converted to an intermediate language (e.g., .NET MSIL) or the executable code may be stored for running at some later time.

The table below maps example data structure return types and corresponding actions that the programming environment takes on behalf of the programmer to ensure that the types match:

| API A | API B | Action Taken |
| --- | --- | --- |
| Returns Array | Expects Array | None |
| Returns Object | Expects Object | None |
| Returns Array | Expects Object | Processing of array into loop(s) |
| Returns Object | Expects Array | Promotes object to one-element array |

As can be seen, the programming environment takes no explicit action when the data structure types match. When they do not match, however, the environment processes an output array into a serialized set of one or more objects each provided via a loop to the recipient, or promotes an output object into a one-element array.

Figure 2:
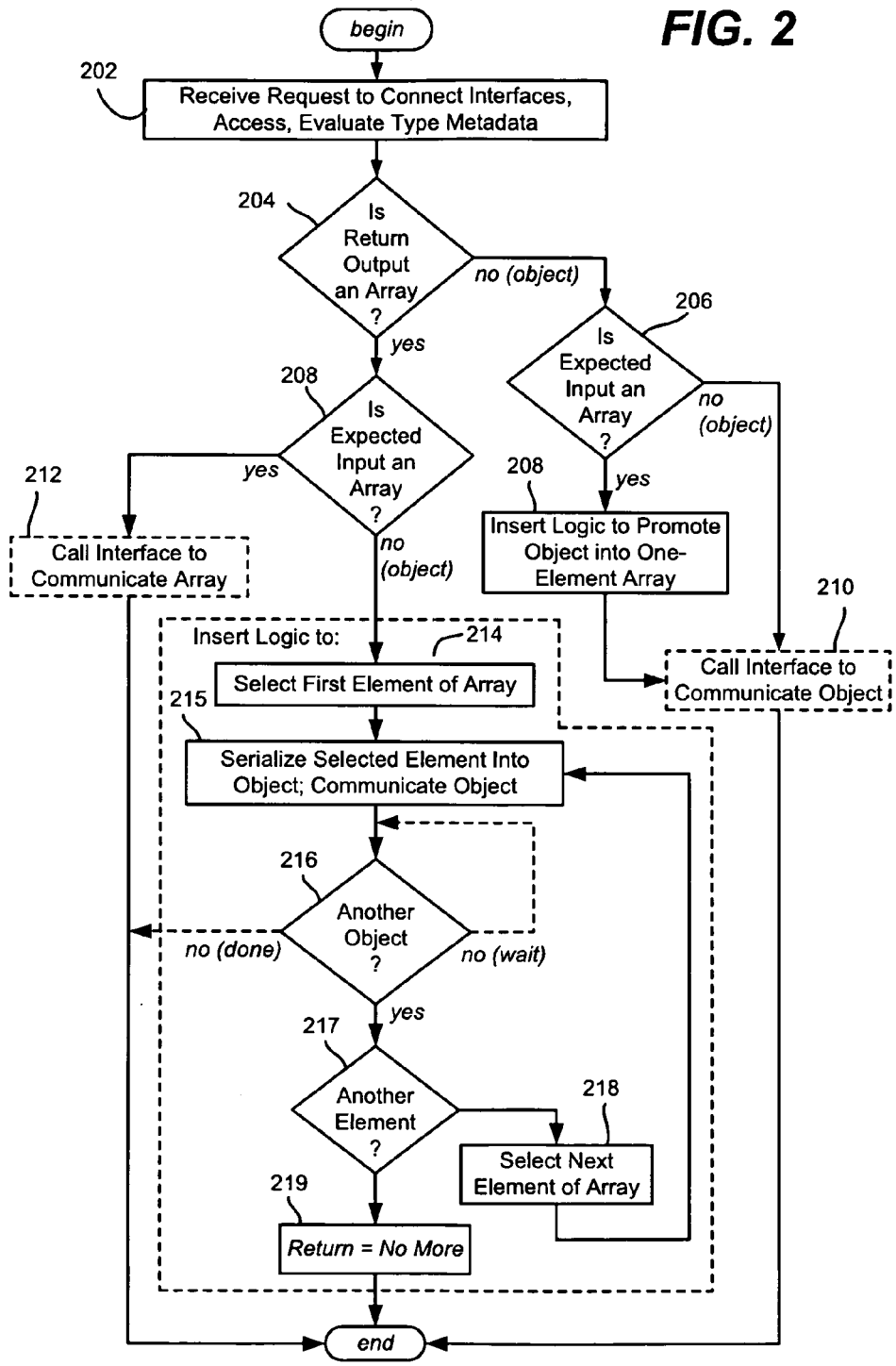
FIG. 2 is a flow diagram showing example steps taken to evaluate data types of components that are coupled together, including transparently matching data types when appropriate by inserting logic to promote or process mismatched types into compatible types.

FIG. 2 shows example steps that may be taken to match types, including transparently inserting code as described herein to handle type mismatches. This example process begins at step 202, where, for example a programmer has connected two components such that one component outputs to the other's input interface. This may be done in a programming environment by manipulating icons representing the components in a graphical user interface, or for example, by a parser/pre-compiler if the programmer has entered text commands and the like, e.g.:

string( ) photoNames=x.get names( )
    y.sendPN(photoNames).

In any event, in general, once the user connects two components, the programming environment performs a check to ensure that the output and expected input structures match. If they do not, the programming environment inserts logic (e.g., promoting code or processing code, as described below) into the program that appropriately converts the type or types so as to match.

In this example, step 204 represents checking whether the return output is an array (versus an object). Note that the programming environment via the components' type metadata has knowledge about the underlying components, providing the ability to "touch" such data before it is passed between different components. More particularly, when the programming environment loads an API, for example, the programming environment also loads metadata about the API that includes its input and output types and structures.

Thus, if at step 204 the return output is an object, and the expected input is an object at step 206, no action is taken. Step 210 is shown to represent communicating the object from the outputting component to the inputting component when appropriate during the runtime operation.

If at step 204 the returned output is in the form of an object, but at step 206 the data input component is instead expecting an array, step 208 is executed to promote the object into a one-element array. To this end, the programming environment takes the "list" that is the object, and turns it into a one-element array (one-row table). In other words, via logic described in steps 204, 206 and 208, when the output of API A is an object and the input of API B can only be an array, the logic creates an array with one element and populates its attributes with the object's properties. Note that conceptually, the object corresponds to a list with one column, and multiple rows, in which each line in the list corresponds to some attribute describing the overall object. Thus, with these types, the programming environment's knowledge of the type data allows the programming environment to insert conversion code so that the output type matches the input type. Thus, during the runtime, via the logic inserted at step 208, the output will be converted to an array to match the input (step 210), as described above with reference to the API C 140 and API D 144 example of FIG. 1.

Returning again to step 204, when the return output is structured as an array, step 208 evaluates whether the receiving input component is also expecting an array. If so, both are configured to deal with arrays and no intervening action is taken in this example; step 212 is shown to represent communicating the array from the outputting component to the inputting component when appropriate during the runtime operation.

Steps 214 through 219 represent another type mismatch that is handled, namely the array to object processing, this time by insertion of the processing logic. In processing, the programming environment loops through each element of the array and turns the "row" of the "table" into an object, that is, into a simple list. That is, the array is conceptually a table that includes rows and columns, in which the rows are elements of the array and the columns are the attributes of each element.

In general, steps 204 and 206 have conditionally asked whether the data of the output component is arranged as an array while the input of the other component needs to be an object. If so, for each element in the array, as a simple list of that element is returned via steps 214-219. Note that in this example, step 216 represents receiving a request for another object (which will be the next element), while step 217 represents determining whether another element exists, returning the element via step 218 until none remain, at which time a return code or the like may indicate that no more elements remain (step 219).

Thus, returning to the example of FIG. 1, when the API A 130 is called, e.g., by the running application or the programming environment on behalf of the running application, the API A 130 returns an array, e.g., the array of photographs that also includes various bits of information about the photograph. When the programming environment processes the array, the programming environment notices from the receiving API's associated metadata that the API B 134 in the application cannot accept an array as input, but rather requires another structure, namely an object. This triggers the execution of a path in the programming environment that loops through the array and convert each element in the array into an object. As the programming environment loops through the elements of the array, it outputs objects and passes them to the API B 134. The API B 134 receives the outputted objects from the programming environment and completes the execution of the application. During this process, the API B 134 may be called multiple times.

As can be seen, components (e.g., APIs) that are returning or expecting different data structures such as objects or arrays) may be coupled to communicate without requiring proactive intervention on the part of the programmer. As described above, this is facilitated by providing the programming environment with knowledge of the data structures returned by the components that may be used. As a result, the programming environment is able to make design time and/or runtime conversions between arrays and objects that are returned and expected by different components.

Exemplary Operating Environment

Figure 3:
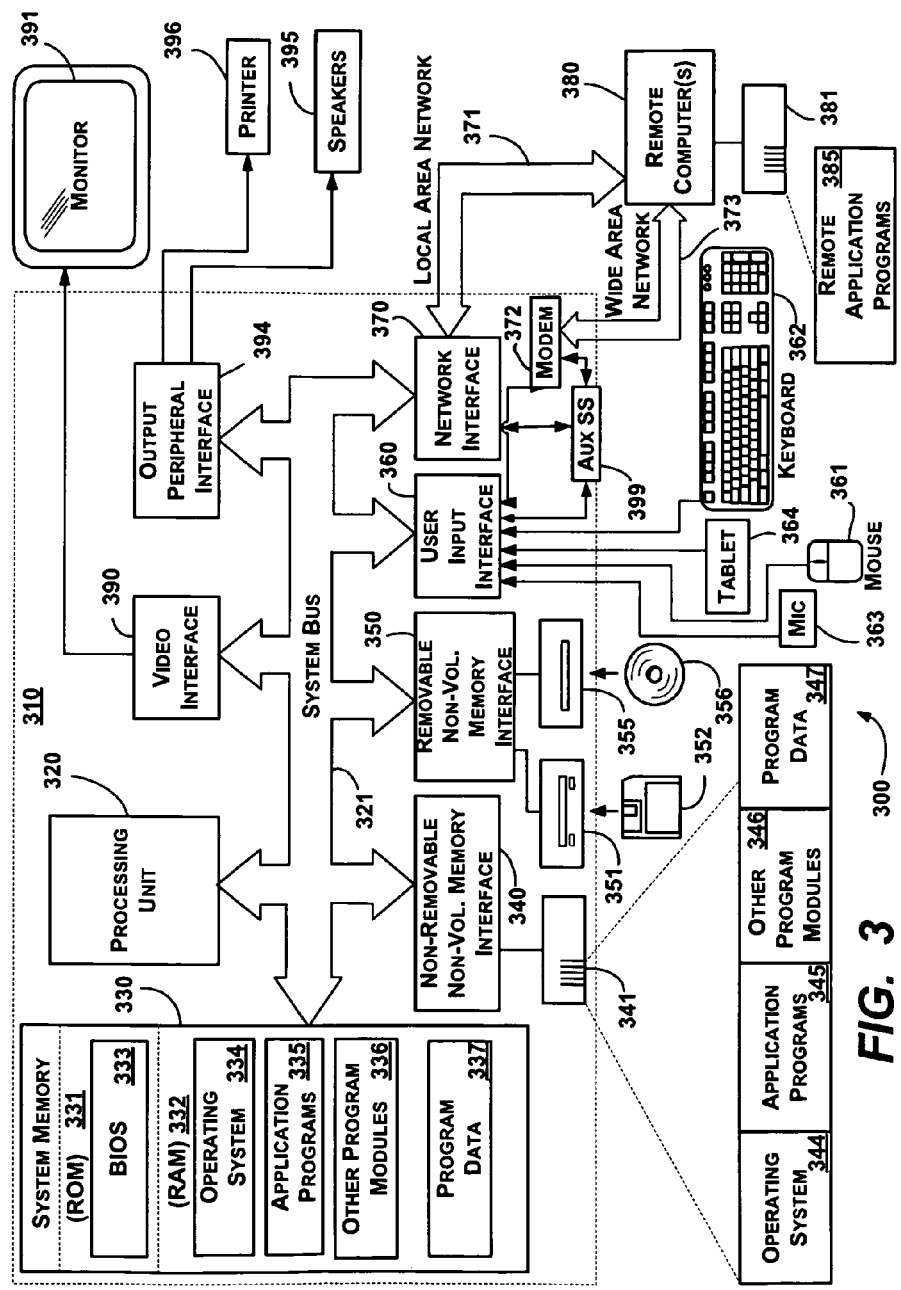
FIG. 3 shows an illustrative example of a computing environment into which various aspects of the present invention may be incorporated.

FIG. 3 illustrates an example of a suitable computing and networking environment 300 into which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component 374 such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising: initiating a request within a development environment, to connect graphical representations of a first software component and a second software component in programming code, including automatically performing the steps of: accessing a store of metadata corresponding to the software components; evaluating data type information of the first and second software components that are coupled together for data communication; detecting that the first software component, which is to receive input data corresponding to output data from the second software component is not able to process the output data as structured by the second software component; and performing an operation to insert conversion code into the programming code corresponding to the software components, which when the programming code is compiled and run as executable code, the executable code performs at least one of an array-to-object conversion or an object-to-array conversion for data communication between the software components.

2. The method of claim 1 further comprising accessing metadata within the store of metadata that indicates output type information of the second software component and input type information of the first software component.

3. The method of claim 1 further comprising handling programmer manipulation of first and second icons representing the first and second software components, respectively.

4. The method of claim 3 further comprising, changing a visible representation with respect to at least one of the first and second icons, or a representation of a coupling between the first and second icons, or both, to indicate that the operation is to be performed to execute the logic that converts the output data as structured by the second software component into input data that the first software component is able to process.

5. The method of claim 1 further comprising processing text referencing the first and second software components.

6. The method of claim 1 further comprising providing code to convert a plurality objects to an array.

7. The method of claim 1 further comprising providing code to convert an array into a plurality of objects.

8. The method of claim 1 further comprising providing code to convert an array into a plurality of objects, including code that communicates the plurality of objects, one object at a time, from the second software component to the first software component.

9. The method of claim 1 wherein performing the operation to execute the logic comprises recognizing a type mismatch between the output data and input data at runtime, and changing an execution path to convert the output data to input data that the first software component is able to process.

10. The method of claim 1 further comprising recognizing a type mismatch between the output data and input data prior to execution.

11. In a computing environment, a system comprising: a store of metadata corresponding to software components configured to develop programming code, and conversion logic configured to access the store of metadata, which when executed by a processor to perform a method, the method comprising: initiating a request to connect graphical representations of a first software component and a second software component in a development environment wherein the first software component and the second software component are precompiled into programming code; in response to the initiating, automatically performing the steps of: evaluating data type information of first and second software components that are coupled together for data communication, and if the data type information indicates that the first software component's output is of a data structure type that is mismatched with the second component's input, performing an operation to insert conversion code into the programming code, wherein when the programming code is compiled and run as executable code, the executable code converts the first software component's array output into at least one object expected by the second software component or converts the first software component's object output into an array input expected by the second software component.

12. The system of claim 11 further comprising a graphical user interface by which the programming code is developed, including means for manipulating icons representative of the first and second software components.

13. The system of claim 11 wherein the first software component comprises an application programming interface having a defined interface for calling by the second software component.

14. The system of claim 11 wherein the conversion logic converts the mismatched structures by providing code to convert an object output by the first software component to an array expected by the second software component, or by providing code to convert an array output by the second software component to at least one object expected by the first software component.

15. The system of claim 11 wherein the conversion logic converts the mismatched structures at runtime.

16. One or more computer-readable storage memory having computer-executable instructions, which when executed perform steps in response to execution by a computer, cause the computer to perform steps, comprising: initiating a request to connect graphical representations of a first software component and a second software component in a development environment wherein the first software component and the second software component are precompiled into programming code, in response to the initiating, automatically performing the steps of: evaluating metadata within a store of metadata comprising type information associated with each software component; and if the type information indicates that the first software component's output is of a data structure type that is mismatched with the second software component's input, performing an operation to insert conversion code into the programming code, wherein executing the conversion code converts the first software component's array output to a data structure type that matches the second software component's object input.

17. The one or more computer-readable storage memory of claim 16 wherein evaluating the metadata comprises determining a mismatch when the first software component's output is structured as an array and that the second software component's input is expecting an object, and wherein performing the operation comprises processing the array into a plurality of objects, and communicating each object to the second software component.

18. The one or more computer-readable storage memory of claim 16 wherein evaluating the metadata comprises determining a mismatch when the first software component's output is structured as an object and that the second software component's input is expecting an array, and wherein performing the operation comprises promoting the object into a single-element array for communicating to the second software component.

19. The one or more computer-readable storage memory of claim 16 wherein evaluating the metadata and performing the operation occurs at runtime.

* * * * *